(12) United States Patent
Wei (10) Patent No.: US 11,879,187 B2
(45) Date of Patent: Jan. 23, 2024

(54) SYSTEM AND METHOD FOR COLORED WOVEN LABEL FABRICATION

(71) Applicant: Fu-Hua Pai, New Taipei (TW)

(72) Inventor: Hong-Ming Wei, Guiyang (CN)

(73) Assignee: Fu-Hua Pai, New Taipei (TW)

( * ) Notice: Subject to any disclaimer, the term of this patent is extended or adjusted under 35 U.S.C. 154(b) by 556 days.

(21) Appl. No.: 17/149,085

(22) Filed: Jan. 14, 2021

(65) Prior Publication Data
US 2021/0222333 A1      Jul. 22, 2021

(30) Foreign Application Priority Data

Jan. 17, 2020   (CN) ......................... 202010050163.6

(51) Int. Cl.
| | |
|---|---|
| *D03D 15/54* | (2021.01) |
| *D03D 1/00* | (2006.01) |
| *D03D 13/00* | (2006.01) |
| *G09F 3/00* | (2006.01) |
| *G06K 19/02* | (2006.01) |
| *G06K 19/06* | (2006.01) |
| *G07C 3/14* | (2006.01) |
| *G06T 11/40* | (2006.01) |
| *D06B 11/00* | (2006.01) |
| *D06H 1/00* | (2006.01) |

(52) U.S. Cl.
CPC ......... *D03D 1/0011* (2013.01); *D03D 13/004* (2013.01); *G06K 19/027* (2013.01); *G06K 19/06037* (2013.01); *G07C 3/143* (2013.01); *G09F 3/0297* (2013.01); *D06B 11/002* (2013.01); *D06H 1/00* (2013.01)

(58) Field of Classification Search
CPC .... D03D 1/0011; D03D 13/004; D03D 15/54; G06K 19/027; G06K 19/06037; G06K 19/022; G06K 19/06046; G07C 3/143; G09F 3/0297; D06B 11/002; D06B 11/0076; D06H 1/00; D06P 5/004; G06T 7/0004; G06T 2207/30124
See application file for complete search history.

(56) References Cited

U.S. PATENT DOCUMENTS

| | | | | |
|---|---|---|---|---|
| 1,795,770 | A * | 3/1931 | Fromuth ................ | D03D 23/00 28/166 |
| 2,002,359 | A * | 5/1935 | Baylis ..................... | B41F 17/10 28/163 |
| 2,522,816 | A * | 9/1950 | Fiderer ................... | D02H 3/00 28/194 |
| 3,550,543 | A * | 12/1970 | Crawford ............... | D03D 27/00 156/72 |
| 3,669,818 | A * | 6/1972 | Stark ..................... | D06C 23/00 26/69 R |
| 3,850,783 | A * | 11/1974 | Peters ................... | D05C 17/026 156/72 |
| 3,955,379 | A * | 5/1976 | Corbiere ............... | D04B 39/00 66/1 R |

(Continued)

*Primary Examiner* — Robert H Muromoto, Jr.
(74) *Attorney, Agent, or Firm* — Rosenberg, Klein & Lee (57) ABSTRACT

A system for colored woven label fabrication includes an image processing device, a yarn coloring mechanism and a weaving machine. The yarn coloring mechanism colors a yarn to be woven into a colored woven label by the weaving machine according to a weaving electronic file generated by the image processing device.

15 Claims, 9 Drawing Sheets

(56) References Cited

U.S. PATENT DOCUMENTS

| | | | | |
|---|---|---|---|---|
| 3,958,406 | A * | 5/1976 | Corbiere | D01D 5/20 57/206 |
| 4,005,569 | A * | 2/1977 | Corbiere | D02G 1/002 57/208 |
| 4,259,994 | A * | 4/1981 | Hobson | D03D 27/08 139/1 R |
| 4,587,153 | A * | 5/1986 | Sella | A47G 9/0284 428/196 |
| 4,619,120 | A * | 10/1986 | Markowitz | D04B 21/165 66/193 |
| 4,640,529 | A * | 2/1987 | Katz | D05C 1/08 347/3 |
| 4,923,848 | A * | 5/1990 | Akada | B44C 1/1716 347/213 |
| 4,999,026 | A * | 3/1991 | Albert | B41M 5/385 8/922 |
| 5,016,183 | A * | 5/1991 | Shyong | D03C 19/005 700/86 |
| 5,027,988 | A * | 7/1991 | Corbiere | D06J 1/00 112/63 |
| 5,058,174 | A * | 10/1991 | Carroll | D03C 19/005 348/93 |
| 5,200,904 | A * | 4/1993 | Tottman | D03C 3/20 700/131 |
| 5,212,845 | A * | 5/1993 | Corbiere | D06B 11/0076 8/149.1 |
| 5,307,283 | A * | 4/1994 | Sawazaki | D04B 9/28 700/131 |
| 5,377,509 | A * | 1/1995 | Corbiere | D06B 11/0076 68/5 D |
| 5,712,673 | A * | 1/1998 | Hayashi | B41M 5/30 347/217 |
| 6,043,191 | A * | 3/2000 | Imamura | B41M 5/38214 428/32.6 |
| 6,082,412 | A * | 7/2000 | Wildeman | D06P 5/00 428/196 |
| 6,123,117 | A * | 9/2000 | Borellini | D03D 1/0011 139/420 A |
| 7,272,244 | B2 * | 9/2007 | Saporiti | D03C 19/005 700/131 |
| 7,460,927 | B1 * | 12/2008 | Lai | D04B 7/08 66/232 |
| 8,381,773 | B2 * | 2/2013 | Sho | D03C 3/205 139/65 |
| 9,027,366 | B2 * | 5/2015 | Raynor | D04B 39/00 66/1 R |
| 11,351,767 | B2 * | 6/2022 | Weedlun | B44C 1/1712 |
| 2001/0004509 | A1 * | 6/2001 | Hayashi | B41M 5/385 430/200 |
| 2003/0007821 | A1 * | 1/2003 | Hori | B41J 2/325 400/487 |
| 2005/0264642 | A1 * | 12/2005 | Tischer | D03D 1/0011 347/213 |
| 2006/0070681 | A1 * | 4/2006 | Haroutoonian | D03D 1/0011 139/383 R |
| 2006/0247819 | A1 * | 11/2006 | Speich | D03D 1/0011 700/130 |
| 2010/0330334 | A1 * | 12/2010 | Feng | D06N 3/0063 428/142 |
| 2011/0027505 | A1 * | 2/2011 | Majumdar | B41M 5/5281 428/32.52 |
| 2011/0143060 | A1 * | 6/2011 | Majumdar | B41M 5/529 428/32.52 |
| 2012/0164405 | A1 * | 6/2012 | Webb | D03D 1/0011 428/196 |
| 2014/0109362 | A1 * | 4/2014 | Bassi | G09F 3/02 28/163 |
| 2016/0176175 | A1 * | 6/2016 | Strauss | B32B 37/10 156/286 |
| 2017/0037546 | A1 * | 2/2017 | Lau | G06K 19/027 |
| 2017/0270834 | A1 * | 9/2017 | Vandyk | A41D 27/08 |
| 2017/0305178 | A1 * | 10/2017 | Kuhne | B41M 5/38214 |
| 2018/0057975 | A1 * | 3/2018 | Montorfano | D06H 1/02 |
| 2020/0193251 | A1 * | 6/2020 | Ellis | D04B 1/126 |
| 2021/0222333 | A1 * | 7/2021 | Wei | G06K 19/027 |
| 2023/0220592 | A1 * | 7/2023 | Kim | D06P 1/00 139/420 R |

\* cited by examiner

SYSTEM AND METHOD FOR COLORED WOVEN LABEL FABRICATION

CROSS-REFERENCE TO RELATED APPLICATION

This application claims priority of Chinese Invention Patent Application No. 202010050163.6, filed on Jan. 17, 2020.

FIELD

The disclosure relates to colored woven label, more particularly to a system and method for colored woven label fabrication.

BACKGROUND

A two-dimensional code is a black-and-white figure distributed on a plane with some specific geometric figures according to a certain rule, and can express a relatively large amount of information in a small area. Most of the two-dimensional codes used in packaging boxes or tags on clothing are made by printing. However, in case where printed labels are not wear-resistant and water-resistant, printed two-dimensional codes are easy to blur or fade slowly after a few times of washing. Thus, it is difficult to recognize the label, which adversely affects reading of information expressed by the two-dimensional codes. Moreover, the two-dimensional codes may be reproduced easily by scanning the image of the two-dimensional codes and then printing the image out by a printer. As a consequence, two-dimensional codes are very easy to be copied and lack of an anti-counterfeiting effect.

Chinese Invention Patent application No. CN109295586A discloses a conventional method for weaving a two-dimensional code fabric trademark. The conventional method uses a textile machine to weave a two-dimensional code fabric trademark that is able to be repeatedly washed without blurring the two-dimensional code. However, in order to weave a colored two-dimensional code fabric trademark to enhance anti-counterfeiting effect, yarns with colors such as red, orange, yellow, and green are all knitted into basic-colored yarns. For example, when it is needed to expose red color, red yarns are exposed on an upper layer of a fabric. On the other hand, when the red color is not needed to be visible, the red yarns are concealed under other colors of yarns. Consequently, the fabric made by the conventional method is relatively thick, resulting in poor softness and causing uncomfort to a user. Moreover, a relatively large amount of raw materials are needed, thereby increasing production cost.

In addition, in the traditional dyeing process of the colored yarns, a large amount of water vapor and fuel are used, which causes air pollutions and damages the environment. Further, use of chemicals such as dye accelerating agent generates a lot of waste water, and subsequent waste water treatment results in a lot of waste of resources, land and facilities.

SUMMARY

Therefore, an object of the disclosure is to provide system and method for colored woven label fabrication that can alleviate the drawback of the prior art.

According to one aspect of the disclosure, a system for colored woven label fabrication is provided. The system includes an image processing device, a yarn coloring mechanism and a weaving machine. The image processing device is adapted to be communicatively connected to a database storing a plurality of data files which are respectively indicative of a plurality of labels, and is configured to generate a weaving electronic file according to one of the data files indicative of the respective one of the labels to be fabricated.

The yarn coloring mechanism is adapted for coloring a yarn to be woven into a colored woven label according to the weaving electronic file, and includes a heating roller, an inner winding device, a yarn winding device, an outer winding device, a liner paper winding device and a pressing device. The heating roller is rotatable about its axis, has an outer circumferential surface, and includes a heater element heating the outer circumferential surface. The inner winding device is adapted to wind an inner colored paper thereon, and to guide the inner colored paper toward the heating roller such that a portion of the inner colored paper is pressed against and covers a portion of the outer circumferential surface. The yarn winding device is adapted to wind a yarn thereon, and to guide the yarn toward the heating roller such that a portion of the yarn is pressed against the portion of the inner colored paper covered on the portion of the outer circumferential surface. The outer winding device is adapted to wind an outer colored paper thereon, to guide the outer colored paper toward the heating roller such that a portion of the outer colored paper is pressed against and covers the portion of the yarn pressed against the portion of the inner colored paper. The liner paper winding device is adapted to wind a liner paper thereon, and to guide the liner paper toward the heating roller such that a portion of the liner paper is pressed against and covers the portion of the outer colored paper covered on the portion of the yarn. The pressing device includes a pressing belt looped over the heating roller, circulating continuously, and is adapted to press the portion of the liner paper covered on the portion of the outer colored paper against the heating roller so as to transfer the colors of the inner and outer colored papers onto the yarn. The weaving machine is electrically connected to the image processing device and is adapted to weave the portion of the yarn being transferred with the colors into a colored woven label according to the weaving electronic file.

According to another aspect of the present disclosure, a method for colored woven label fabrication to be implemented by a system for colored woven label fabrication is provided. The system includes an image processing device, a yarn coloring mechanism and a weaving machine. The method includes steps of:

providing a database that stores a plurality of data files respectively indicative of a plurality of labels;
generating, by the image processing device, a weaving electronic file according to one of the data files indicative of the respective one of the labels to be fabricated;
transferring, by the yarn coloring mechanism, colors of inner and outer colored papers onto a yarn such that the yarn is sandwiched between the inner and outer colored papers; and
weaving, by the weaving machine, the yarn being transferred with the colors into a colored woven label according to the weaving electronic file.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
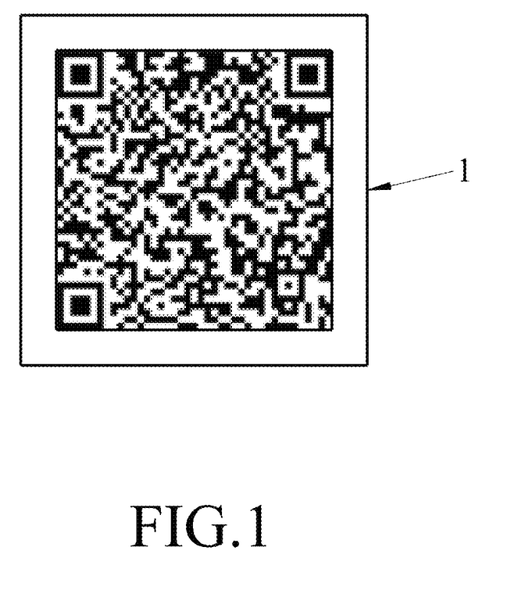
FIG. 1 is a schematic diagram illustrating a colored woven label fabricated by a method for colored woven label fabrication according to one embodiment of the present disclosure.
Figure 2:
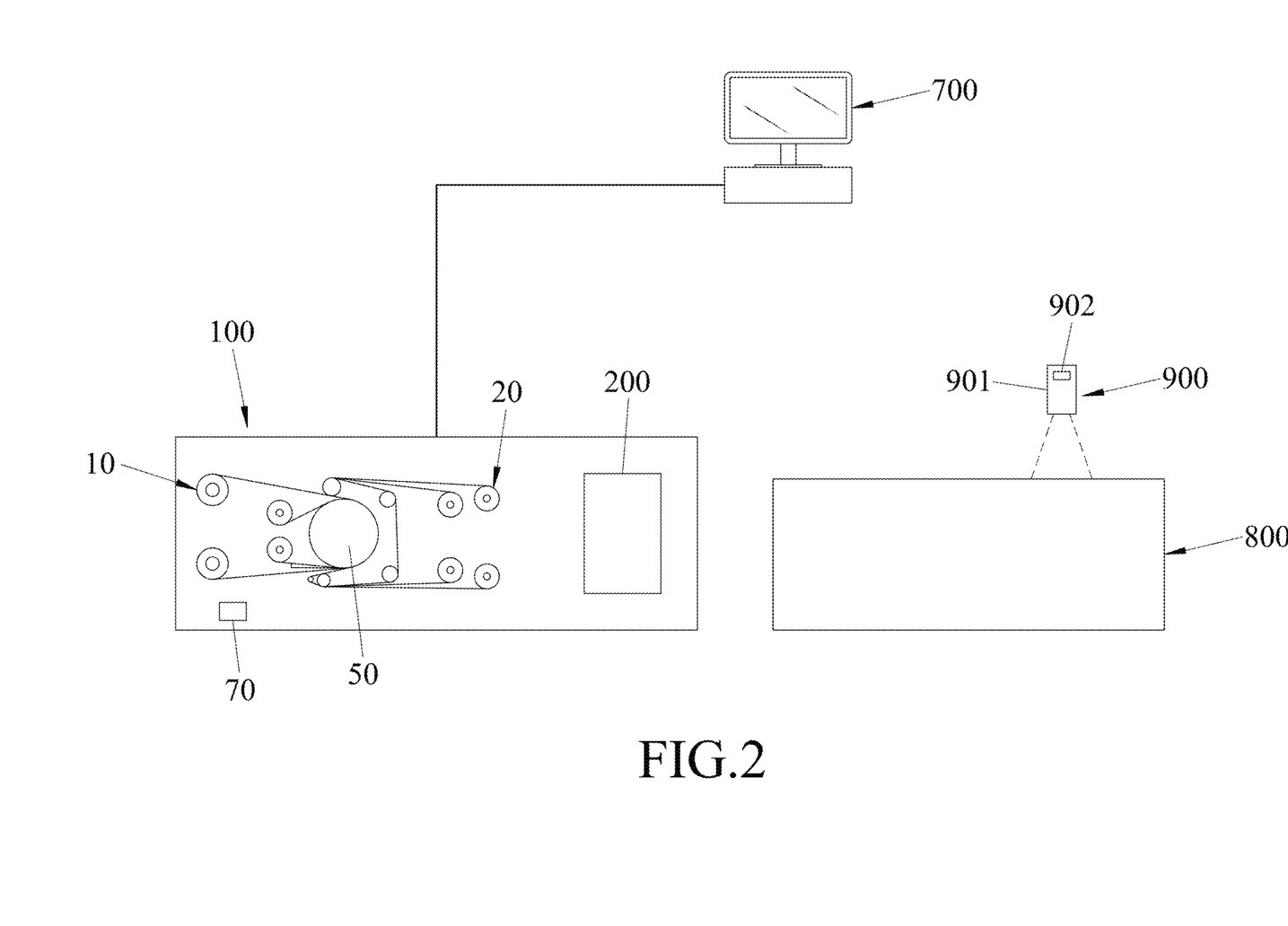
FIG. 2 is a schematic side view of a system for colored woven label fabrication according to another embodiment of the present disclosure.
Figure 3:
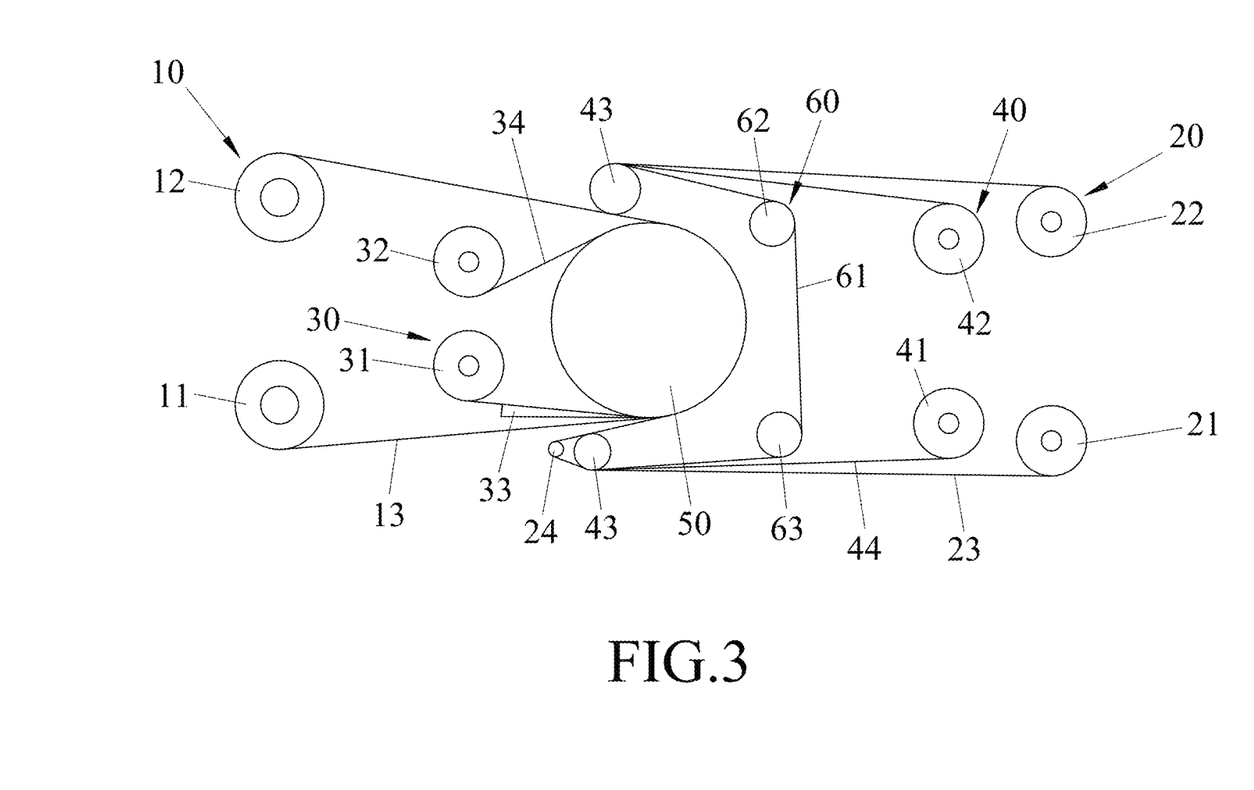
FIG. 3 is a schematic side view of a yarn coloring mechanism of the system.

Referring to FIGS. 2 to 3, an embodiment of a system for colored woven label fabrication according to the present disclosure is provided. An example of colored woven label 1 fabricated by the system is shown in FIG. 1.

The system includes an image processing device 700, a yarn coloring mechanism 100, a weaving machine 800 and an analyzing device 900.

The image processing device 700 is adapted to be communicatively connected to a database storing a plurality of data files which are respectively indicative of a plurality of labels. Each of the data files stored in the database includes parameter information for generating a two-dimensional quick response code and optionally includes a string including one of a character such as an alphabet, numbers and a combination thereof. The parameter information includes one of a web address, a product traceability and verification code, and a combination thereof.

Figure 6:
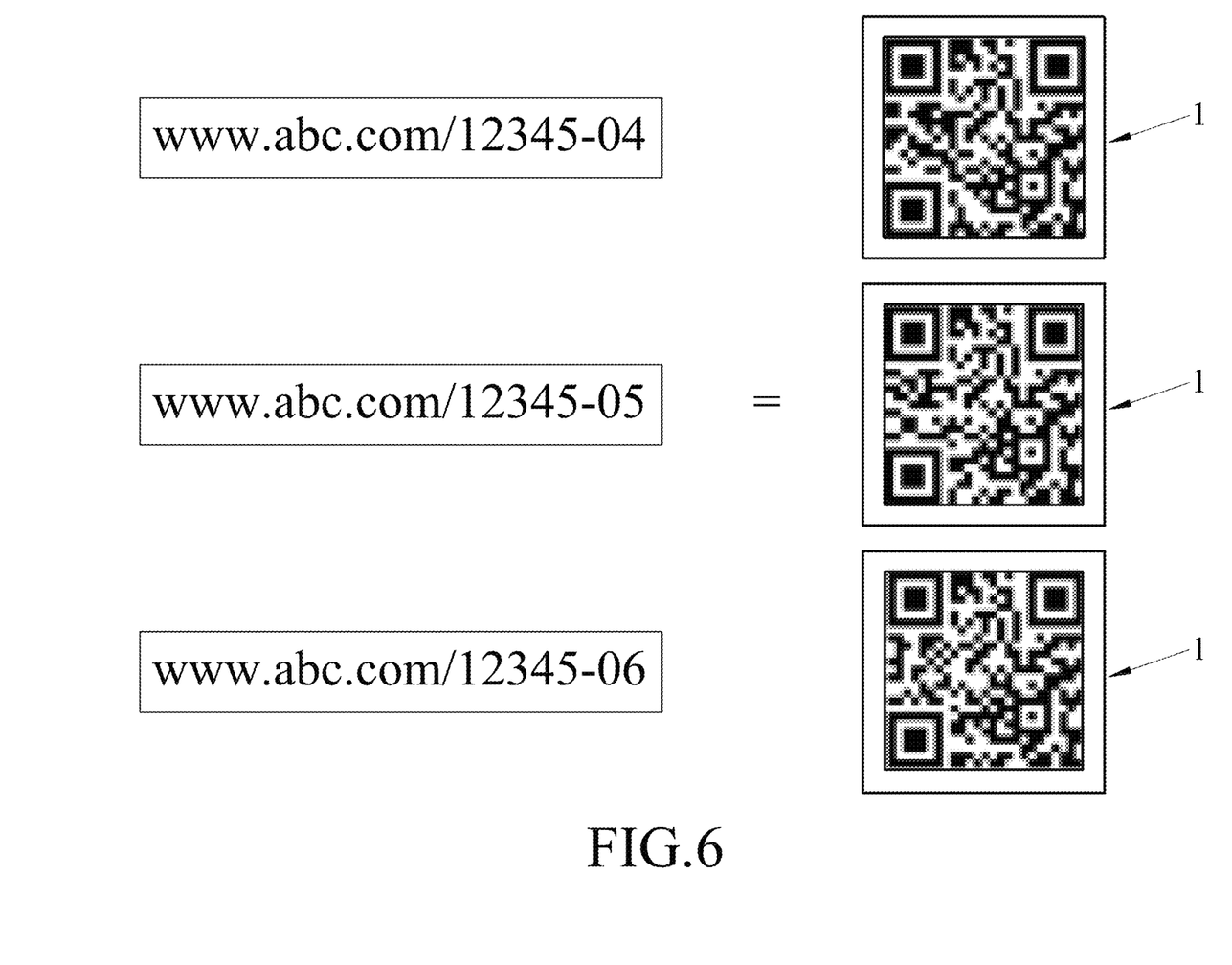
FIG. 6 is a schematic diagram illustrating three examples of colored woven labels fabricated by the present disclosure, and three web addresses respectively expressed by three two-dimensional codes in the respective colored woven labels.
Figure 7:
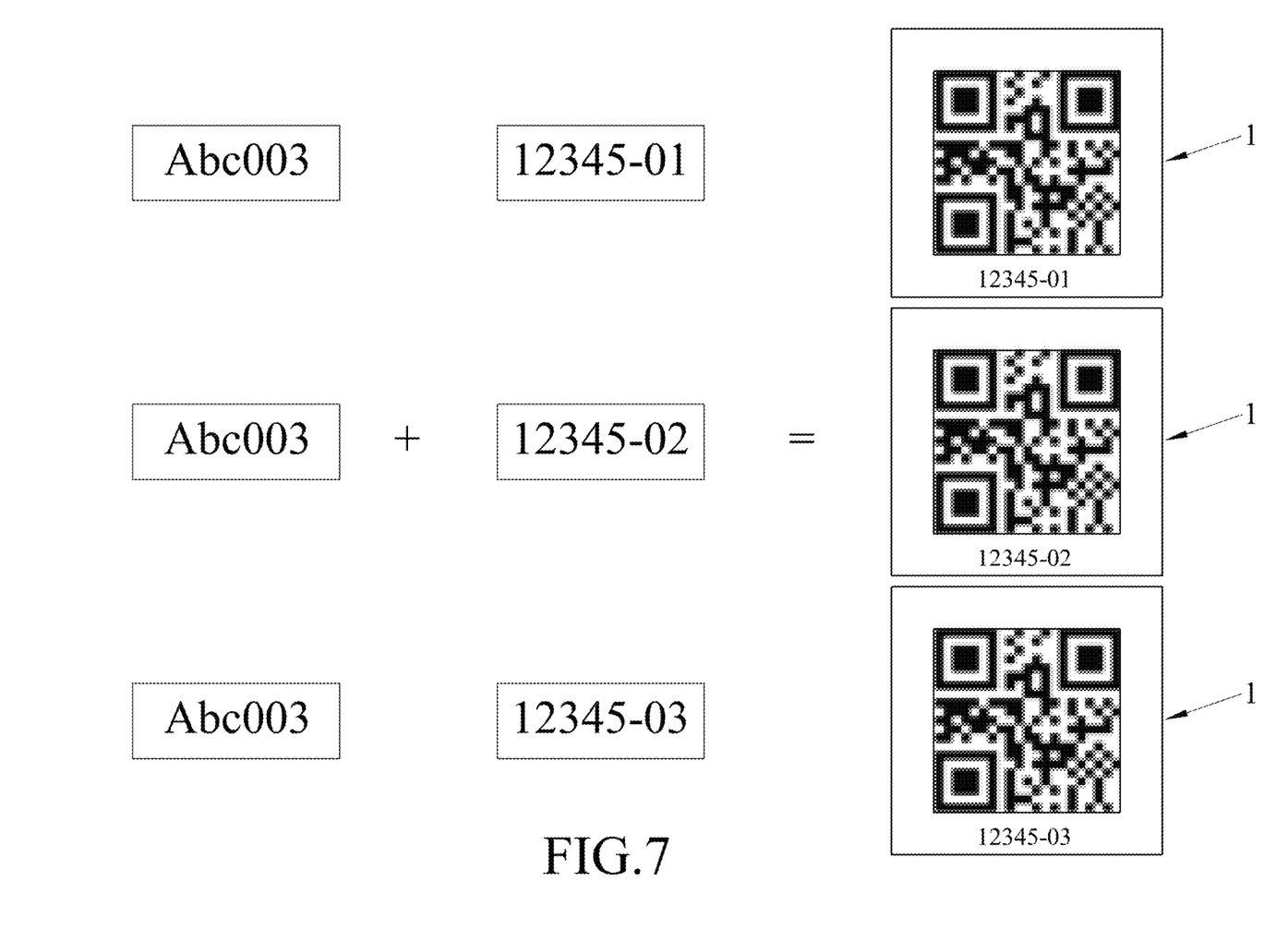
FIG. 7 is similar to FIG. 6, but illustrating each of colored woven labels including a two-dimensional code and a string of numbers.
Figure 8:
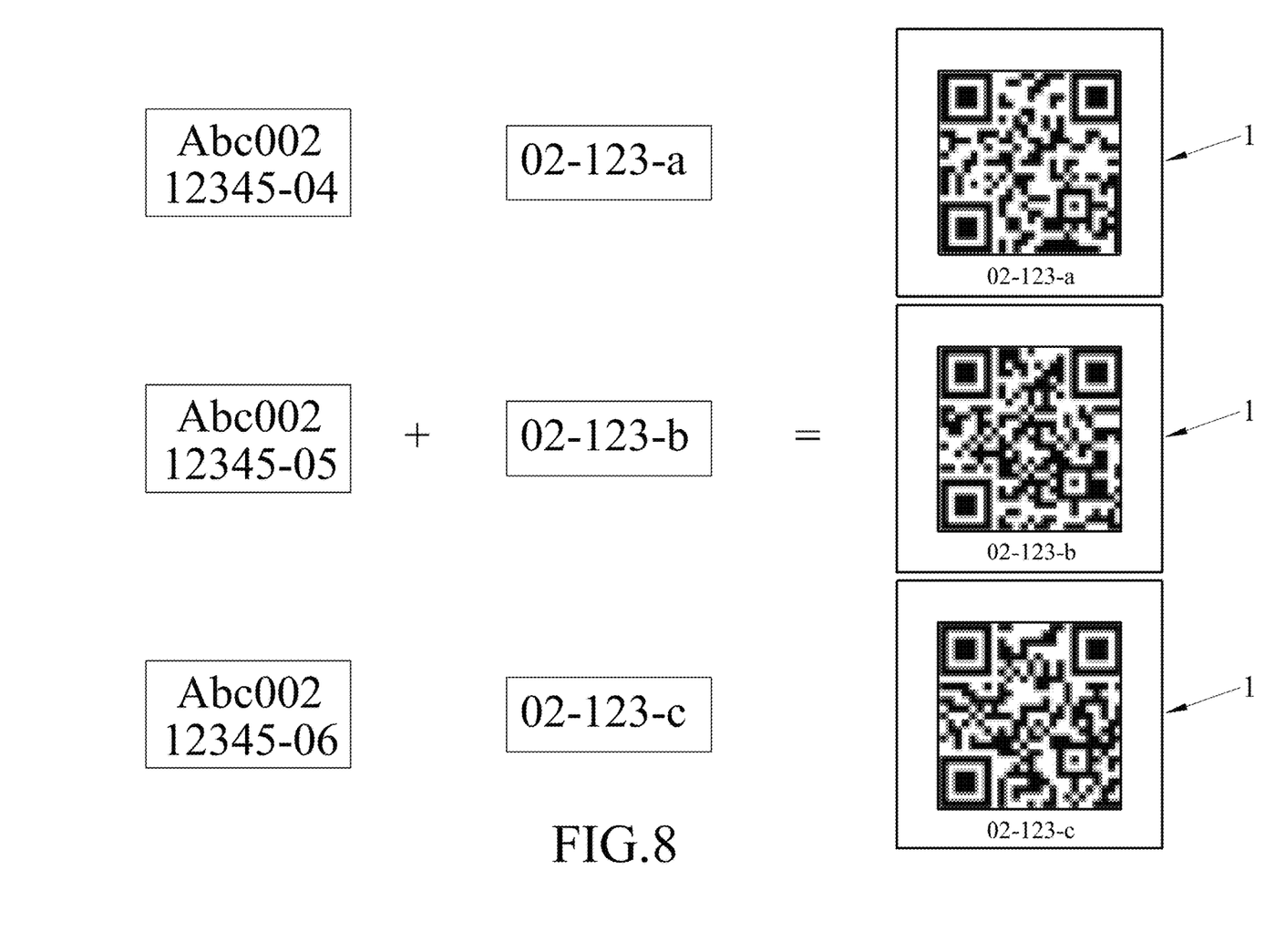
FIG. 8 is similar to FIG. 7, but illustrating another three examples of colored woven labels fabricated by the present disclosure, each of the colored woven labels including a two-dimensional code and a string of characters and numbers.

Referring to FIGS. 6 to 8, some examples of the data files stored in the database are shown. FIG. 6 shows three example data files arranged respectively in three rows. The left column represents three web addresses to be respectively generated to form three two-dimensional quick response codes included respectively in three colored woven labels 1 at the right column. As shown in FIG. 7, the left column shows product traceability and verification codes to be generated to form three two-dimensional quick response codes at the right column, and the middle column is a string of numbers such as manufacturing batch numbers to be woven respectively under the two-dimensional codes.

FIG. 8 shows three examples of the data files, each of which includes parameter information and a string. Specifically, the left column in FIG. 8 is the parameter information for generating respectively the two-dimensional codes at the right column, the middle column is the strings respectively included in the data files, and the right column is the colored woven labels including the two dimensional codes and the strings.

The image processing device 700 is configured to generate a weaving electronic file according to one of the data files indicative of the respective one of the labels to be fabricated and to generate a coloring electronic file based on the weaving electronic file generated from the one of the data files.

The yarn coloring mechanism 100 is adapted for coloring a yarn 13 that is to be woven into a colored woven label according to the weaving electronic file. The yarn coloring mechanism 100 includes a paper coloring mechanism 200, a heating roller 50, an inner winding device 30, a yarn winding device 10, two tension rollers 43, an outer winding device 20, a liner paper winding device 40, a pressing device 60 and a controller 70.

The paper coloring machine 200 is adapted to color plain papers according to the coloring electronic file to obtain inner and outer colored papers 34, 23. In this embodiment, dye for coloring is ink, such as thermal transfer ink, paint ink, reactive ink, acid ink, pigment ink or weak-solvent ink. Then, the inner and outer colored papers 34, 23 are respectively wound on the inner and outer winding devices 30, 20.

Figure 4:
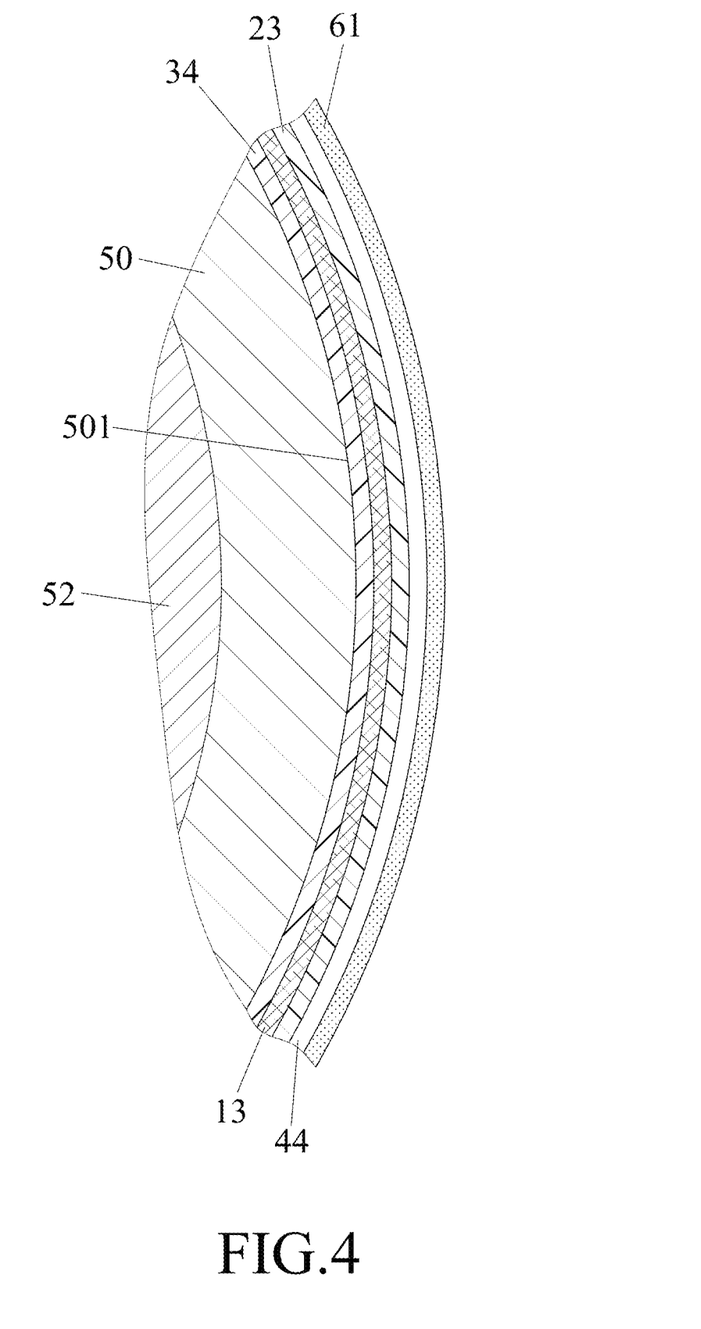
FIG. 4 is a fragmentary sectional view of a heating roller of the system, illustrating a plain yarn being sandwiched between inner and outer colored papers so as to transfer colors of the inner and outer colored papers onto the yarn.

Further referring to FIG. 4, the heating roller 50 is rotatable about its axis, has an outer circumferential surface 51, and includes a heater element 52 heating the outer circumferential surface 51.

The inner winding device 30 includes an inner feeding reel 31, a guiding plate 33 and an inner rewind reel 32. The inner feeding reel 31 is adapted to feed the inner colored paper 34 toward the heating roller 50. The guiding plate 33 is disposed between the inner feeding reel 31 and the heating roller 50 and is adapted to guide the inner colored paper 34 from the inner feeding reel 31 onto the outer circumferential surface 51 of the heating roller 50 such that a portion of the inner colored paper 34 is pressed against and covers a portion of the outer circumferential surface 51. The inner rewind reel 32 is disposed downstream of the heating roller 50 and is adapted to rewind the inner colored paper 34 thereon.

The yarn winding device 10 includes a yarn feeding reel 11 on which the yarn is wound and a yarn rewinding reel 12. The yarn feeding reel 11 is adapted to feed the yarn 13 toward the heating roller 50 such that a portion of the yarn 13 is pressed against the portion of the inner colored paper 34 covered on the portion of the outer circumferential surface 51. The yarn rewinding reel 12 is disposed downstream of the heating roller 50 and is adapted to rewind the yarn 13 thereon.

The tension rollers 43 flank the heating roller 50. In the following description, the upper one of the tension roller 43 in FIG. 3 is referred to as the upper tension roller 43 and the lower one of the tension roller 43 is referred to as the lower tension roller 43.

As shown in FIG. 3, the outer winding device 20 is disposed at the right side of the heating roller 50 and includes an outer feeding reel 21, a guiding roller 24, and an outer rewind reel 22. The outer feeding reel 21 is adapted to feed the outer colored paper 23 toward the guiding roller 24.

The guiding roller 24 is rotatable about its axis, is disposed under the heating roller 50 and adjacent to the lower tension roller 43, and is adapted to guide the outer colored paper 23 from the outer feeding reel 21 toward the heating roller 50. The outer colored paper 23 is guided to sequentially press against the lower tension roller 43, the guiding roller 24, the heating roller 50, and the upper tension roller 43 such that a portion of the outer colored paper 23 is pressed against and covers the portion of the yarn 13 pressed against the portion of the inner colored paper 34. The outer rewind reel 22 is spaced apart from the outer feeding reel 21, is disposed downstream of the upper tension roller 43, and is adapted to rewind the outer colored paper 23 thereon.

The liner paper winding device 40 is disposed adjacent to the outer winding device 20, and is adapted to wind a liner paper 44 thereon and to guide the liner paper 44 toward the heating roller 50. Specifically, the liner paper winding device 40 includes a liner paper feeding reel 41 and a liner paper rewind reel 42 spaced apart from the liner paper feeding reel 41. The liner paper feeding reel 41 is adapted to feed the liner paper 44 toward the lower tension roller 43. The liner paper 44 is guided to sequentially press against the lower tension roller 43, the guiding roller 24, the heating roller 50, and the upper tension roller 43 such that a portion of the liner paper 44 is pressed against and covers the portion of the outer colored paper 23 covered on the portion of the yarn 13. The liner paper rewind reel 42 is disposed downstream of the heating roller 50 and is adapted to rewind the liner paper 44 thereon.

The pressing device 60 is disposed adjacent to the liner paper winding device 40 and includes a pressing belt 61, a support shaft 62, and an offset shaft 63. The support shaft 62 is disposed between the liner paper rewinding reel 42 and the upper tension roller 43. The offset shaft 63 is disposed between the liner paper feeding reel 41 and the lower tension roller 43. The pressing belt 61 is looped over the support shaft 62, the offset shaft 63, the upper and lower tension rollers 43, and the heating roller 50, circulates continuously among the support shaft 62, the offset shaft 63, the tension rollers 43, and the heating roller 50, and is adapted to press the portion of the liner paper 44 covered on the portion of the outer colored paper 23 against the heating roller 50 so as to transfer the colors of the inner and outer colored papers 34, 23 onto the yarn 13.

In this embodiment, the pressing belt 61 is a heat-resistant belt. The upper and lower tension rollers 43 are adapted to permit the outer colored paper 23, the liner paper 44, and the pressing belt 61 to extend therearound, such that the outer colored paper 23, the liner paper 44 and the pressing belt 61 are in a tensioned state.

In this embodiment, the controller 70 (see FIG. 2) is configured to control the temperature of the heater element 52 for heating the outer circumferential surface 51. The controller 70 is further configured to control operations of the yarn winding device 10, the inner winding device 30, the outer winding device 20, the liner paper winding device 40 and the heating roller 50 for feeding the yarn 13, the inner and outer color papers 34, 23, and the liner paper 44 toward the heating roller 50, and to drive the tension rollers 43 to move, so as to press the pressing belt 61 toward the outer circumferential surface 501 of the heating roller 50, such that the colors of the inner and outer colored papers 34, 23 are heated by the heating roller 50 and thus are transferred onto the yarn 13 by thermal sublimation.

By virtue of the liner paper 44, the colors of the inner and outer colored papers 34, 23 can be prevented from being transferred onto the pressing belt 61, which may adversely affect subsequent color transfer.

Figure 9:
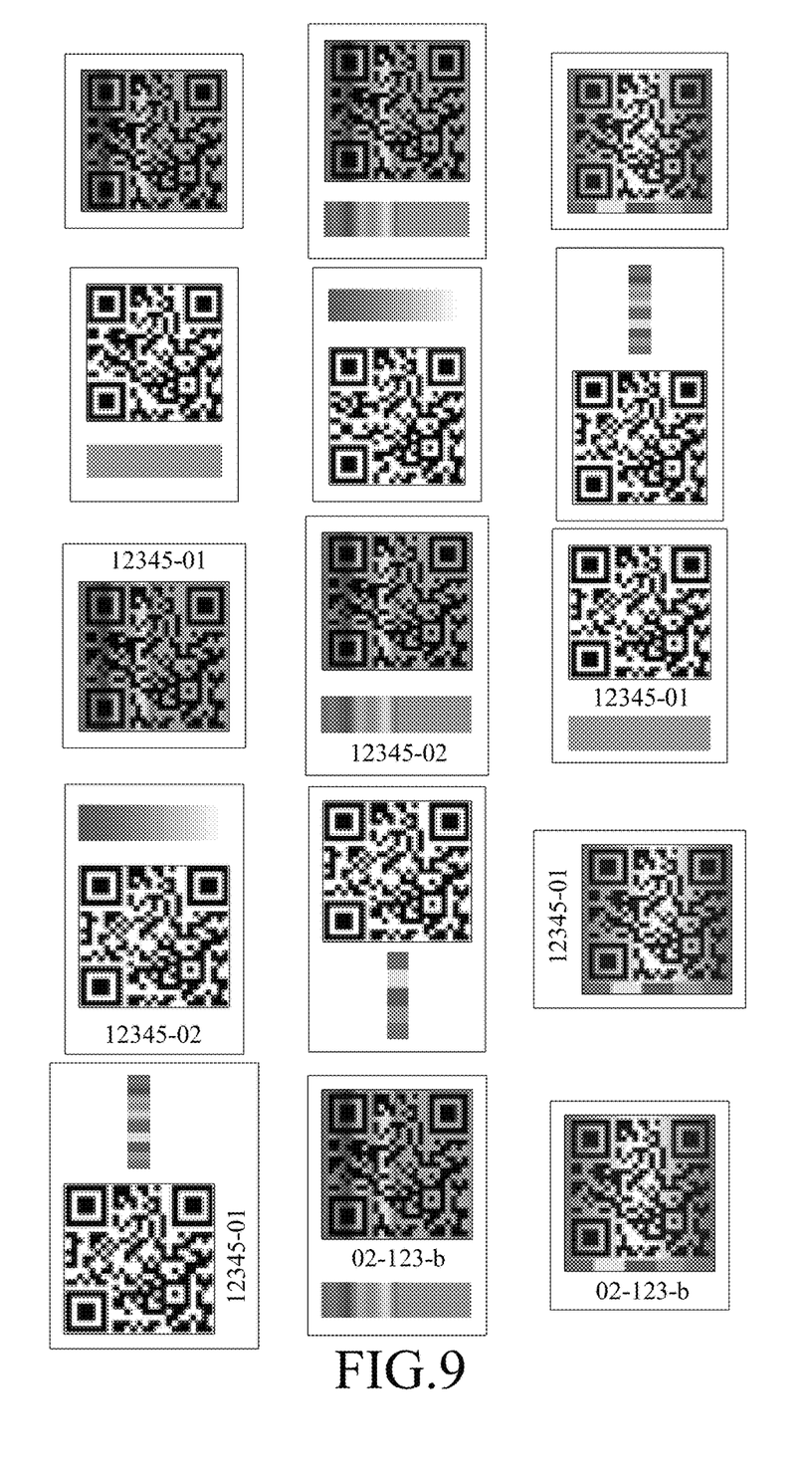
FIG. 9 is a schematic diagram illustrating a plurality of colored woven labels fabricated by the present disclosure.

The weaving machine 800 is electrically connected to the image processing device 700 and is adapted to weave the portion of the yarn 13 being transferred with the colors into a colored woven label, e.g. the label shown in FIG. 1, according to the weaving electronic file. In this embodiment, the weaving machine 800 is adapted to weave the yarn 13 into a colored woven label including a colored two-dimensional quick response code and/or a string of characters and numbers and/or a colored block. As shown in FIG. 9, some examples of the colored woven labels 1 are shown. It should be appreciated that since the main feature of the present disclosure does not reside in the specific color in the colored woven label, the grayscale portions in each woven label shown in FIG. 9 represent different colors.

The analyzing device 900 is configured to analyze the colored woven label fabricated by the weaving machine 800 and to generate an analysis result indicative of whether the colored woven label satisfies a predetermined criterion. In this embodiment, referring back to FIG. 2, the analyzing device 900 includes a scanner 901 and a processor 902 electrically connected to the scanner 901. The scanner 901 is configured to scan the colored woven label 1 so as to obtain a scanned label file representing information of the colored woven label 1, and is configured to transmit the scanned label file to the processor 902.

The processor 902 is configured to compare the scanned label file with a pre-stored label file that is stored in the database and that is included in one of the data files indicative of the one of the labels being fabricated so as to analyze the colored woven label 1. The processor 902 is configured to generate the analysis result indicative of whether the colored woven label 1 satisfies a predetermined criterion. 1. Note that the main feature of the present disclosure does not reside in the manner to analyze the colored woven label 1, any other techniques capable of generating an analysis result may be employed in other embodiments of the present disclosure.

Note that each of the image processing device 700 and the processor 902 is a microcontroller or a controller such as, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

Figure 5:
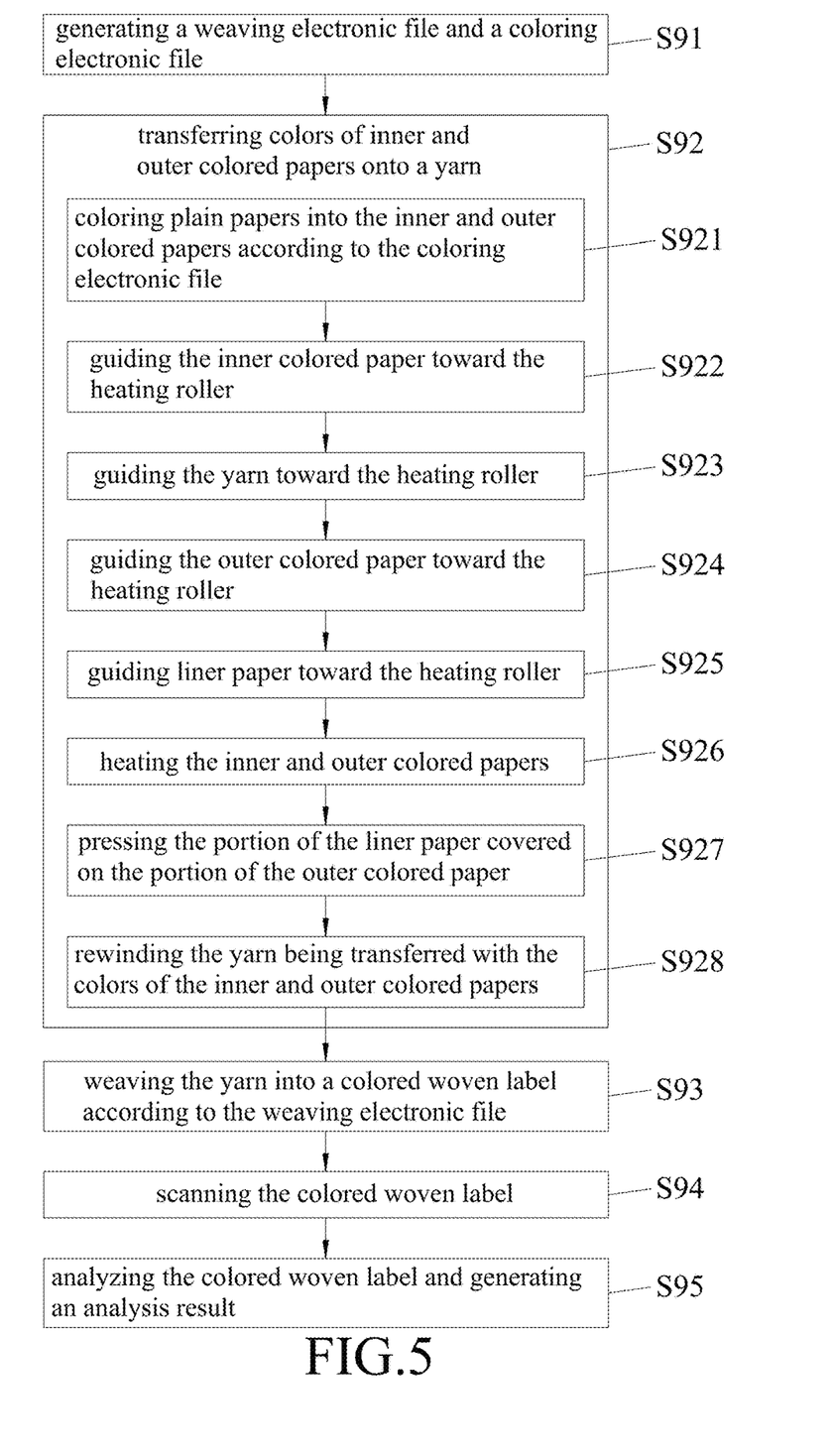
FIG. 5 is a flow chart of a method for colored woven label fabrication according to one embodiment of the present disclosure.

Further referring to FIG. 5, a method for colored woven label fabrication to be implemented by the system described in FIGS. 2 to 4 is shown.

In step S91, the image processing device 700 generates a weaving electronic file according to one of the data files indicative of the respective one of the labels to be fabricated, and a coloring electronic file based on the weaving electronic file generated from the one of the data files. In this embodiment, the coloring electronic file is a digital file converted from the weaving electronic file and includes different color distributions and regions for coloring plain papers into colored papers.

In step S92, the yarn coloring mechanism 100 transfers the colors of the inner and outer colored papers 34, 23 onto a yarn 13 such that the yarn 13 is sandwiched between the inner and outer colored papers 34, 23. Note that in other embodiments, a plurality of yarns 13 may be arranged side by side and parallel to one another so that the yarn coloring mechanism 100 transfers the colors of the inner and outer colored papers 34, 23 onto the yarns 13 at one time.

Step S92 includes sub-steps S921 to S928. In step S921, the paper coloring machine 200 colors plain papers according to the coloring electronic file to obtain inner and outer colored papers 34, 23. In step S922, the inner winding device 30 guides the inner colored paper 34 toward the heating roller 50 to cover a portion of the outer circumferential surface 51. Specifically, the inner feeding reel 31 feeds the inner colored paper 34 toward the guiding plate 33. The guiding plate 33 guides the inner colored paper 34 toward the heating roller 50 to cover a portion of the outer circumferential surface 51. The inner rewinding reel 32 rewinds the inner colored paper 34 thereon.

In sub-step S923, the yarn winding device 10 guides the yarn 13 toward the heating roller 50 to press against a portion of the inner colored paper 34 covered on the outer circumferential surface 51.

In sub-step S924, the outer winding device 20 guides the outer colored paper 23 toward the heating roller 50 to cover a portion of the yarn 13 on the portion of the inner colored paper 23. Specifically, the outer feeding reel 21 feeds the outer colored paper 23 sequentially to the lower tension roller 43, the guiding roller 24, the heating roller 50, and the upper tension roller 43. Then, the outer rewinding reel 22 rewinds the outer colored paper 23 thereon.

In sub-step S925, the liner paper winding device 40 guides the liner paper 44 toward the heating roller 50 to press against and to cover the portion of the outer colored paper 23 covered on the portion of the yarn 13.

In sub-step S926, the heater element 52 heats the inner and outer colored papers 34, 23 through the outer circumferential surface 51.

In sub-step S927, the pressing belt 61 of the pressing device 60 presses the portion of the liner paper 44 covered on the portion of the outer colored paper 23, the portion of the outer colored paper 23 covered on the portion of the yarn 13, the portion of the yarn 13 pressed against the portion of the inner colored paper 34 and the portion of the inner colored paper 34 against the heating roller 50 so as to transfer the colors of the inner and outer colored papers 34, 23 onto the yarn 13 by thermal sublimation.

After the colors of the inner and outer colored papers 34, 23 are transferred onto the yarn 13, in step S928, the yarn rewinding reel 12 rewind the yarn 13 thereon.

In step S93, the weaving machine 800 weaves the yarn 13 being transferred with the colors and plain yarns (not shown) that are arranged as warps and wefts into the colored woven label 1 according to the weaving electronic file.

In step S94, the scanner 901 of the analyzing device 900 scans the colored woven label 1 so as to obtain the scanned label file representing information of the colored woven label 1 and transmits the scanned label file to the processor 902.

In step S95, the processor 902 of the analyzing device 900 analyzes the colored woven label 1 by comparing the scanned label file with the pre-stored label file and generates the analysis result indicative of whether the colored woven label 1 satisfies a predetermined criterion. The colored woven labels 1 fabricated by the present disclosure may be categorized into two groups that respectively satisfies and does not satisfy the predetermined criterion, and the numbers of the colored woven labels in the two groups may be counted to obtain yield rate of the colored woven labels 1.

To sum up, by virtue of the paper coloring machine 200 that colors the inner and outer colored papers 34, 23 according to the coloring electronic file, different colors are transferred onto the yarn 13 to be woven into the colored woven label. Thus, it is not required to knit multiple color yarns in one label and the colored woven label fabricated by the present disclosure is thinner than the fabric trademark made by the conventional method described in the background section. In this way, the cost for fabricating the colored woven label can be reduced while the softness of the colored woven label is improved. Further, the colors of the inner and outer colored papers 34, 23 are transferred onto the yarn 13 by thermal sublimation, which requires no water and is relatively eco-friendly.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A system for colored woven label fabrication, comprising:
   an image processing device that is adapted to be communicatively connected to a database storing a plurality of data files which are respectively indicative of a plurality of labels, and that is configured to generate a weaving electronic file according to one of the data files indicative of the respective one of the labels to be fabricated;
   a yarn coloring mechanism adapted for coloring a yarn to be woven into a colored woven label according to the weaving electronic file, and including
      a heating roller that is rotatable about its axis, that has an outer circumferential surface, and that includes a heater element heating said outer circumferential surface,
      an inner winding device that is adapted to wind an inner colored paper thereon, and to guide the inner colored paper toward said heating roller such that a portion of the inner colored paper is pressed against and covers a portion of said outer circumferential surface,
      a yarn winding device that is adapted to wind a yarn thereon, and to guide the yarn toward said heating roller such that a portion of the yarn is pressed against the portion of the inner colored paper covered on the portion of said outer circumferential surface,
      an outer winding device that is adapted to wind an outer colored paper thereon, to guide the outer colored paper toward said heating roller such that a portion of the outer colored paper is pressed against and covers the portion of the yarn pressed against the portion of the inner colored paper, a liner paper winding device that is adapted to wind a liner paper thereon, and to guide the liner paper toward said heating roller such that a portion of the liner paper is pressed against and covers the portion of the outer colored paper covered on the portion of the yarn, and a pressing device that includes a pressing belt looped over said heating roller, circulating continuously, and adapted to press the portion of the liner paper covered on the portion of the outer colored paper pressed against said heating roller so as to transfer the colors of the inner and outer colored papers onto the yarn; and a weaving machine electrically connected to said image processing device and adapted to weave the portion of the yarn being transferred with the colors into a colored woven label according to the weaving electronic file.

2. The system as claimed in claim 1, wherein said yarn coloring mechanism further includes two tension rollers flanking said heating roller, adapted to permit the outer colored paper, the liner paper, and said pressing belt to extend therearound, such that the outer colored paper, the liner paper and said pressing belt are in a tensioned state.

3. The system as claimed in claim 2, wherein said inner winding device includes an inner feeding reel on which the inner colored paper is adapted to be wound, and which is adapted to feed the inner colored paper toward said heating roller, a guiding plate which is disposed between said inner feeding reel and said heating roller and which is adapted to guide the inner colored paper from said inner feeding reel onto said heating roller, and an inner rewind reel which is disposed downstream of said heating roller and which is adapted to rewind the inner colored paper thereon.

4. The system as claimed in claim 3, wherein said outer winding device includes an outer feeding reel on which the outer colored paper is adapted to be wound, and which is adapted to feed the outer colored paper toward said heating roller, a guiding roller which is adapted to guide the outer colored paper from said outer feeding reel onto said heating roller, and an outer rewind reel which is disposed downstream of said heating roller and which is adapted to rewind the outer colored paper thereon.

5. The system as claimed in claim 1, further comprising an analyzing device configured to analyze the colored woven label woven by said weaving machine and to generate an analysis result indicative of whether the colored woven label satisfies a predetermined criterion.

6. The system as claimed in claim 1, wherein said weaving machine is adapted to weave the yarn into the colored woven label including a colored two-dimensional quick response code.

7. The system as claimed in claim 1, wherein said image processing device is further configured to generate a coloring electronic file based on the weaving electronic file generated from the one of the data files, said yarn coloring mechanism further including a paper coloring machine adapted to color plain papers according to the coloring electronic file to obtain the inner and outer colored papers.

8. The system as claimed in claim 1, wherein said yarn coloring mechanism further includes a guiding roller rotatable about its axis and adapted to guide the outer colored paper onto said heating roller.

9. A method for colored woven label fabrication to be implemented by a system for colored woven label fabrication, the system including an image processing device, a yarn coloring mechanism, a weaving machine, a heating roller that is rotatable about its axis, that has an outer circumferential surface, and that includes a heater element for heating the outer circumferential surface, an inner winding device that is wound by the inner colored paper, a yarn winding device that is wound by the yarn, an outer winding device that is wound by the outer colored paper, a liner paper winding device that is wound by a liner paper, and a pressing device that includes a pressing belt looped over the heating roller, circulating continuously, and pressing the liner paper covered on the outer colored paper toward the heating roller so as to transfer the colors of the inner and outer colored papers onto the yarn, the method comprising:

providing a database that stores a plurality of data files respectively indicative of a plurality of labels;

generating, by the image processing device, a weaving electronic file according to one of the data files indicative of the respective one of the labels to be fabricated;

transferring, by the yarn coloring mechanism, colors of inner and outer colored papers onto a yarn such that the yarn is sandwiched between the inner and outer colored papers; and weaving, by the weaving machine, the yarn being transferred with the colors into a colored woven label according to the weaving electronic file, wherein the step of transferring the colors of the inner and outer colored papers onto the yarn includes:

guiding, by the inner winding device, the inner colored paper toward the heating roller to cover a portion of the outer circumferential surface;

guiding, by the yarn winding device, the yarn toward the heating roller to press against a portion of the inner colored paper covered on the outer circumferential surface;

guiding, by the outer winding device, the outer colored paper toward the heating roller to cover a portion of the yarn on the portion of the inner colored paper;

guiding, by the liner paper winding device, the liner paper toward the heating roller to cover a portion of the outer colored paper covered on the portion of the yarn; and pressing, by the pressing belt of the pressing device, the portion of the liner paper covered on the portion of the outer colored paper, the portion of the outer colored paper covered on the portion of the yarn, the portion of the yarn covered on the portion of the inner colored paper, and the portion of the inner colored paper against the heating roller so as to transfer the colors of the inner and outer colored papers onto the yarn.

10. The method as claimed in claim 9, the system further including an analyzing device, the method further comprising step of:

generating, by the analyzing device, an analysis result indicative of whether the colored woven label satisfies a predetermined criterion by analyzing the colored woven label.

11. The method as claimed in claim 9, wherein the step of weaving the yarn into a colored woven label includes weaving a two-dimensional quick response code in the colored woven label.

12. The method as claimed in claim 9, wherein the step of transferring the colors of the inner and outer colored papers onto the yarn includes:

heating, by the heater element, the inner and outer colored papers through the outer circumferential surface to transfer the colors of the inner and outer colored papers onto the yarn by thermal sublimation.

13. The method as claimed in claim 9, the inner winding device including an inner feeding reel wound by the inner colored paper, a guiding plate disposed between the inner feeding reel and the heating roller, and an inner rewind reel disposed downstream of the heating roller, wherein the step of guiding the inner colored paper includes:

feeding, by the inner feeding reel, the inner colored paper toward the guiding plate;

guiding, by the guiding plate, the inner colored paper toward the heating roller to cover a portion of the outer circumferential surface; and rewinding the inner colored paper on the inner rewinding reel.

14. The method as claimed in claim 9, the outer winding device including an outer feeding reel wound by the outer colored paper, a guiding roller disposed between the outer feeding reel and the heating roller, and an outer rewind reel disposed downstream of the heating roller, wherein the step of guiding the outer colored paper includes:

feeding, by the outer feeding reel, the outer colored paper toward the guiding roller;

guiding, by the guiding roller, the outer colored paper toward the heating roller to cover a portion of the yarn pressed against the inner colored paper; and rewinding the outer colored paper on the outer rewinding reel.

15. The method as claimed in claim 9, the yarn coloring mechanism further including a paper coloring machine, the method, before the step of transferring, further comprising generating, by the image processing device, a coloring electronic file based on the electronic file generated from the one of the data files, and coloring, by the paper coloring machine, plain papers according to the coloring electronic file to obtain the inner and outer colored paper.

\* \* \* \* \*